United States Patent
Aldridge

(10) Patent No.: US 8,862,913 B2
(45) Date of Patent: Oct. 14, 2014

(54) METHOD OF SWITCHING POWER MODES AND A PORTABLE ELECTRONIC DEVICE CONFIGURED TO PERFORM THE SAME

(75) Inventor: Dustin Aldridge, Tucson, AZ (US)

(73) Assignee: BlackBerry Limited, Waterloo (CA)

(*) Notice: Subject to any disclaimer, the term of this patent is extended or adjusted under 35 U.S.C. 154(b) by 732 days.

(21) Appl. No.: 12/572,605

(22) Filed: Oct. 2, 2009

(65) Prior Publication Data

US 2011/0080155 A1 Apr. 7, 2011

(51) Int. Cl.
*G06F 1/32* (2006.01)
*H02N 2/18* (2006.01)

(52) U.S. Cl.
CPC ................................ *H02N 2/18* (2013.01)
USPC .............................. 713/320; 713/300

(58) Field of Classification Search
USPC ................ 713/300, 320, 323, 324
See application file for complete search history.

(56) References Cited

U.S. PATENT DOCUMENTS

| | | | |
|---|---|---|---|
| 5,669,004 A | 9/1997 | Sellers | |
| 5,900,875 A | 5/1999 | Haitani et al. | |
| 6,269,449 B1 | 7/2001 | Kocis | |
| 6,300,946 B1 | 10/2001 | Lincke et al. | |
| 6,445,383 B1 * | 9/2002 | Chambers et al. | 345/173 |
| 6,448,988 B1 | 9/2002 | Haitani et al. | |
| 6,504,530 B1 | 1/2003 | Wilson et al. | |
| 6,573,886 B1 | 6/2003 | Lehtinen et al. | |
| 6,601,111 B1 | 7/2003 | Peacock et al. | |
| 6,943,813 B2 | 9/2005 | Haitani et al. | |
| 6,996,784 B2 | 2/2006 | Haitani et al. | |
| 7,084,762 B2 | 8/2006 | Pedrazzini et al. | |
| 7,176,902 B2 | 2/2007 | Peterson, Jr. et al. | |
| 7,199,783 B2 | 4/2007 | Wenstrand et al. | |
| 7,386,858 B1 | 6/2008 | Peacock et al. | |
| 7,469,387 B1 | 12/2008 | Haitani et al. | |
| 7,487,470 B2 | 2/2009 | Haitani et al. | |

(Continued)

FOREIGN PATENT DOCUMENTS

| | | |
|---|---|---|
| DE | 10 2008 014443 A1 | 11/2008 |
| DE | 10 2007 053820 A1 | 5/2009 |

(Continued)

OTHER PUBLICATIONS

EESR of the corresponding EP application No. 09172146.4 dated Feb. 25, 2010.

(Continued)

*Primary Examiner* — Paul Yanchus, III
(74) *Attorney, Agent, or Firm* — Novak Druce Connolly Bove + Quigg LLP

(57) ABSTRACT

The present disclosure provides a method of switching power modes on a portable electronic device and a portable electronic device configured to perform the same. In accordance with one embodiment, there is provided a portable electronic device, having a housing; a processor received within the housing; a display screen connected to the processor and exposed by the housing; a piezoelectric switch connected to the processor disposed in the housing, the piezoelectric switch having a piezoelectric element which generates an electric charge in response to forces applied to the piezoelectric element; and an actuator for engaging the piezoelectric element, the actuator being exposed by the housing and movable within the housing to transfer externally applied forces to the piezoelectric element; wherein the processor is configured for switching between at least two power modes in response to the generation of the electric charge by the piezoelectric element.

20 Claims, 7 Drawing Sheets

(56) References Cited

U.S. PATENT DOCUMENTS

| | | |
|---|---|---|
| 2004/0155860 A1 | 8/2004 | Wenstrand et al. |
| 2005/0078093 A1 | 4/2005 | Peterson et al. |
| 2006/0002203 A1 | 1/2006 | Kondo et al. |
| 2006/0146038 A1 | 7/2006 | Park et al. |
| 2006/0209039 A1* | 9/2006 | Destura et al. ............ 345/173 |
| 2006/0240772 A1 | 10/2006 | Schoening et al. |
| 2006/0244730 A1 | 11/2006 | Jam et al. |
| 2006/0279548 A1 | 12/2006 | Geaghan |
| 2007/0102525 A1 | 5/2007 | Orr et al. |
| 2007/0103449 A1 | 5/2007 | Laitinen et al. |
| 2007/0123738 A1 | 5/2007 | Tokuyasu et al. |
| 2007/0234092 A1 | 10/2007 | Freeman et al. |
| 2008/0123267 A1 | 5/2008 | Orr et al. |
| 2008/0218535 A1* | 9/2008 | Forstall et al. ............ 345/690 |
| 2009/0009478 A1 | 1/2009 | Badali et al. |
| 2009/0014526 A1 | 1/2009 | Rusman et al. |

FOREIGN PATENT DOCUMENTS

| | | |
|---|---|---|
| EP | 1691263 A1 | 8/2006 |
| EP | 2056323 A1 | 5/2009 |
| EP | 2 144 138 A | 1/2010 |
| GB | 2451267 | 1/2009 |
| WO | WO 2006133018 | 12/2006 |
| WO | WO 2007/120042 A | 10/2007 |
| WO | WO 2009/062807 A1 | 5/2009 |
| WO | WO 2009091873 | 7/2009 |

OTHER PUBLICATIONS

New smart sensor from STMicroelectronics translates finger hits into actions, http://www.epn-online.com/page/0352/new-smart-sensor-from-stmicroelectronics-translates-finger-hits-into-actions.html, Jun. 22, 2007.

Samsung S5600 and S5230 TouchScreen Phones, http://www.hardwaresphere.com/2009/03/09/samsung-s5600-s5230-touchscreen-phones/, Mar. 9, 2009.

Review: LG Voyager, http://www.phonescoop.com/articles/article.php?a=175&p=134, at least as early as Aug. 14, 2009.

New Smart Sensor from STMicroelectronics Translates Finger Hits into Actions, http://news.thomasnet.com/fullstory/522634, Jun. 15, 2007.

Examination Report mailed Jan. 20, 2012. In corresponding application No. 09172146.4.

Examination report mailed Oct. 31, 2012, in corresponding European patent application No. 09172146.4.

Extended European Search Report mailed Sep. 7, 2012, in corresponding application No. 12179073.7.

* cited by examiner

METHOD OF SWITCHING POWER MODES AND A PORTABLE ELECTRONIC DEVICE CONFIGURED TO PERFORM THE SAME

TECHNICAL FIELD

The present disclosure relates to portable electronic devices, including but not limited to portable electronic devices having touch screen displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth™ capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed. The power consumed by touch-sensitive displays is a relatively large portion of the total power draw for the device. Accordingly, improvements which reduce the power consumption of touch-sensitive displays of portable electronic devices are desirable.

DETAILED DESCRIPTION OF EXAMPLE EMBODIMENTS

Figure 1:
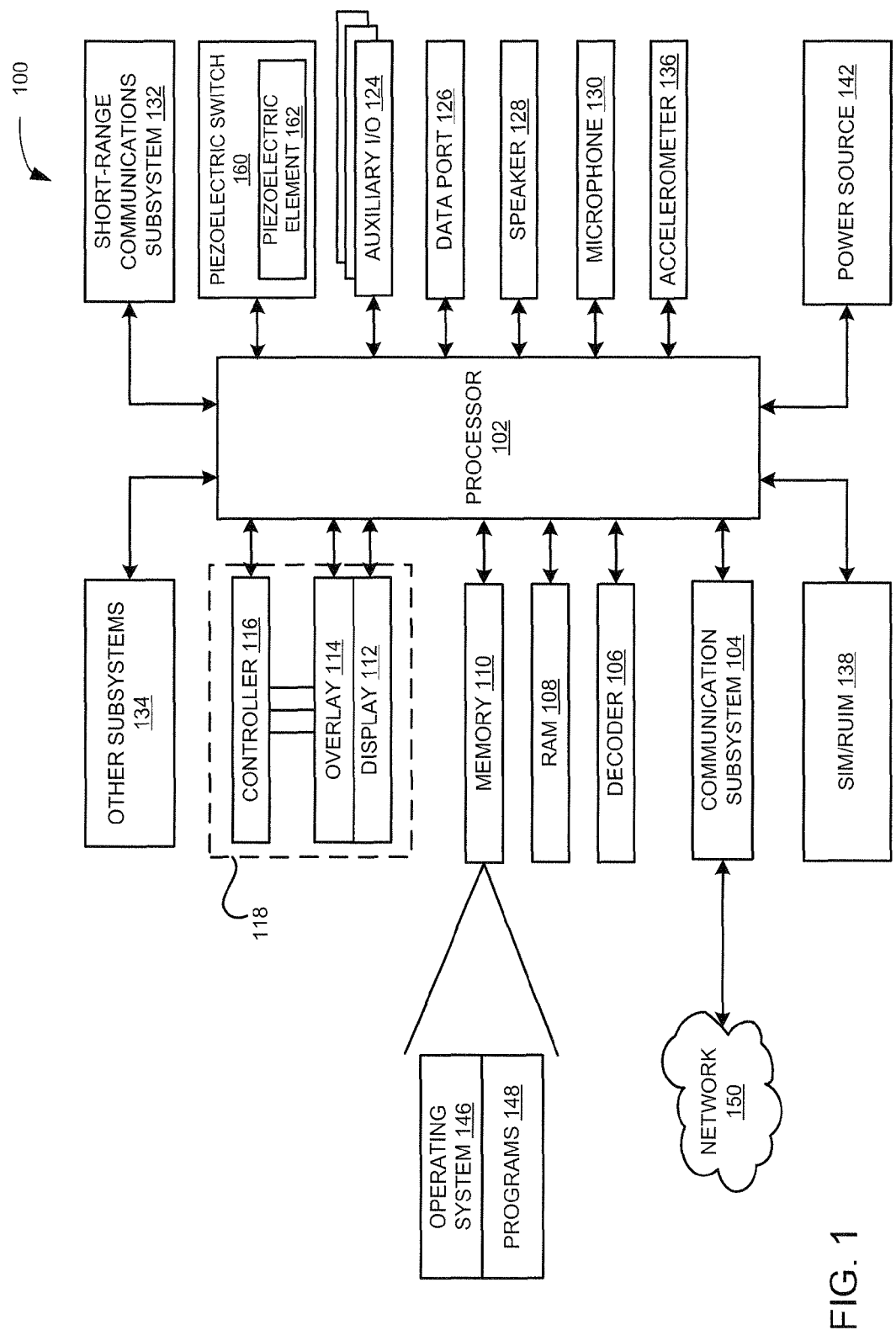
FIG. 1 is a simplified block diagram of components including internal components of a portable electronic device according to one aspect.

Portable electronic devices may have several power modes: a "full-power" mode (also referred to as an "on-mode" or "normal" mode) in which normal full functionality of the device is provided; a sleep-mode (also referred to as a "low power" mode or "standby" mode) in which reduced functionality of the device is provided; and an "off-mode" in which the device is powered-off and performs no functions or a minimized set of functions. To exit the sleep-mode or off-mode, portable electronic devices having a touch-sensitive display typically periodically scan the touch-sensitive display to detect a touch event. When a touch event is detected, the device switches from the sleep-mode or off-mode to the full-power mode. Periodic scanning of the touch-sensitive display consumes scarce power. The present disclosure provides a method of waking a portable electronic device which does not require periodic scanning of the touch-sensitive display, a method of switching power modes on a portable electronic device and a portable electronic device configured to perform the same.

In accordance with one embodiment, there is provided a portable electronic device, comprising: a housing; a processor received within the housing; a display screen connected to the processor and exposed by the housing; a piezoelectric switch connected to the processor disposed in the housing, the piezoelectric switch comprising a piezoelectric element which generates an electric charge in response to forces applied to the piezoelectric element; and an actuator for engaging the piezoelectric element, the actuator being exposed by the housing and movable within the housing to transfer externally applied forces to the piezoelectric element; wherein the processor is configured for switching between at least two power modes in response to the generation of the electric charge by the piezoelectric element.

In accordance with another embodiment, there is provided a method of switching power modes on a portable electronic device, the method comprising: monitoring an output of a piezoelectric element; receiving a force at the piezoelectric element; generating an electric charge at the piezoelectric element in response to the force being received by the piezoelectric element; and switching the portable electronic device between a first power mode and a second power mode in response to the generation of the electric charge. In some embodiments, the display screen of the portable electronic device is deactivated in the power saving mode and wherein switching the portable electronic device to the full-power mode comprises reactivating the display screen. In some embodiments, the method further comprises initiating the power saving mode in response to detection of a trigger condition.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smart-phones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display screen 112 (such as a liquid crystal display (LCD)) with a touch-sensitive overlay 114 operably connected to an electronic controller 116 that together comprise a touch-sensitive display 118, one or more auxiliary input/output (I/O) subsystems 124, a data port 126, a speaker 128, a microphone 130, short-range communications subsystem 132, and other device subsystems 134. It will be appreciated that the electronic controller 116 of the touch-sensitive display 118 need not be physically integrated with the touch-sensitive overlay 114 and display screen 112. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

The device 100 also comprises a piezoelectric switch 160 which is connected to the processor 102. The piezoelectric switch 160 includes at least one piezoelectric element 162 which generates an electric charge in response to a force being applied to the piezoelectric element 162. The processor 102 is configured to switch modes in response to the generation of such an electric charge by the piezoelectric element 162. The piezoelectric switch 160 provides an electric signal to the processor 102 in response to the generation of an electric charge by the piezoelectric element 162. In some embodiments, the processor 102 is configured to switch from one or more power saving modes to a full-power mode in response to receipt of an electrical signal from the piezoelectric switch 160 which indicates that a force has been applied to the piezoelectric element 162.

For example, in some embodiments, if the device 100 is in the off-mode, and the processor 102 determines from the electric signal that a force has been applied to the piezoelectric element 162, the processor 102 switches the device 100 to the full-power mode. Similarly, in at least some embodiments, if the device 100 is in the sleep-mode, and the processor 102 determines from the electric signal that a force has been applied to the piezoelectric element 162, the processor 102 switches the device 100 to the full-power mode.

In this way, the piezoelectric switch 160 acts as a "wake-up" switch or "on" switch to either awake the device 100 from a reduced power mode such as a sleep-mode, or switch the device from an off-mode to an on-mode (full-power mode).

The portable electronic device 100 also includes one or more clocks including a system clock (not shown) and sleep clock (not shown). In other embodiments, a single clock can operate as both system clock and sleep clock. The sleep clock is a lower power, lower frequency clock. By way of example, the system clock may comprise a voltage controlled oscillator operating at a frequency of approximately 700 to 800 megahertz (though the speed of the system clock may vary depending on the mode of the portable electronic device 100), whereas the sleep clock may comprise a low power oscillator operating at a frequency in the range of 30 kilohertz to 60 kilohertz. In one example embodiment, the sleep clock operates at 32 kilohertz to reduce the power consumption.

The auxiliary I/O subsystems 124 could include other input devices such as one or more control keys, a keyboard or keypad, navigational tool (input device), or both. The navigational tool could be a clickable/depressible trackball or scroll wheel, or touchpad. The other input devices could be included in addition to, or instead of, the touch-sensitive display 118, depending on the embodiment.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display screen 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
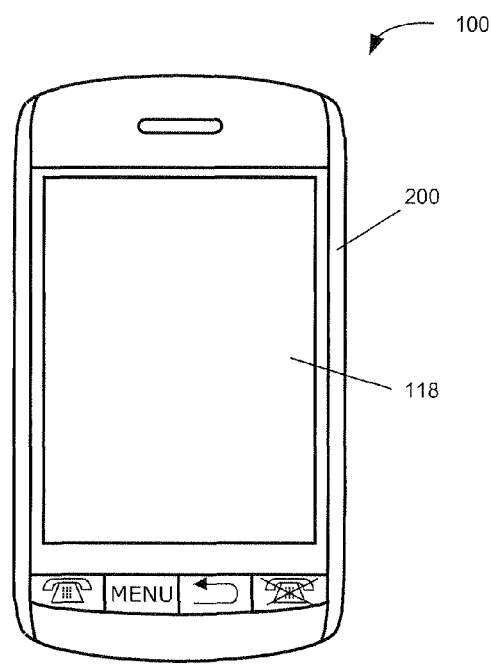
FIG. 2 is a front view of an example of a portable electronic device in a portrait orientation.

FIG. 2 shows a front view of an example of a portable electronic device 100 in portrait orientation. The portable electronic device 100 includes a housing 200 in the form of a rigid case that houses internal components including internal components shown in FIG. 1 and frames the touch-sensitive display 118 such that the touch-sensitive display 118 is exposed for user-interaction therewith when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100.

The housing 200 is configured to be held in a user's hand while the portable electronic device 100 is in use. In the embodiment shown in FIG. 2, the housing 200 is elongate having a length greater than its width. The housing 200 has opposed top and bottom ends, and two left and right sides extending transverse to the top and bottom ends. Although the housing 200 is shown as a single unit, it could, among other possible configurations, include two or more case members hinged together (such as, for example, a flip-phone configuration or a clam shell-style laptop computer). Other device configurations are also possible. The housing 200 can be any suitable housing for the internal components shown in FIG. 1.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a centre of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

Figure 3:
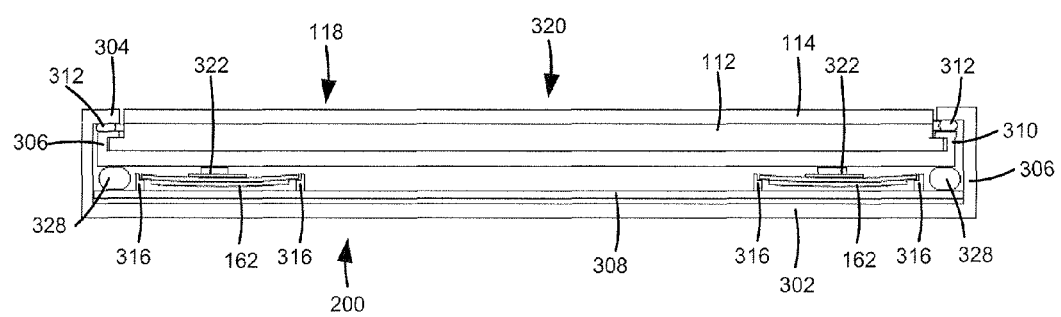
FIG. 3 is a sectional side view of portions of the portable electronic device of FIG. 2.

FIG. 3 shows a sectional side view of portions of the portable electronic device 100 according to one embodiment. The housing 200 in the present example includes a back 302, a frame 304, which frames the touch-sensitive display 118 and sidewalls 306 that extend between and generally perpendicular to the back 302 and the frame 304. A base 308 is spaced from and is generally parallel to the back 302. The base 308 can be any suitable base and can include, for example, a printed circuit board or flexible circuit board supported by a stiff support between the base 308 and the back 302. The back 302 may include a plate (not shown) that is releasably attached for insertion and removal of, for example, the power source 142 and the SIM/RUIM card 138 referred to above. It will be appreciated that the back 302, the sidewalls 306 and the frame 304 may be injection molded, for example. In the example of the portable electronic device 100 shown in FIG. 2, the frame 304 is generally rectangular with rounded corners, although other shapes are possible.

The display screen 112 and the touch-sensitive overlay 114 are supported on a support tray 310 of suitable material such as magnesium for providing mechanical support to the display screen 112 and touch-sensitive overlay 114. The display screen 112 and touch-sensitive overlay 114 are biased away from the base 308, toward the frame 304 by biasing elements 328 such as gel pads between the support tray 310 and the base 308. Compliant spacers 312 which, for example, can also be in the form of gel pads are located between an upper portion of the support tray 310 and the frame 304. The touch-sensitive display 118 is moveable within the housing 200. The touch-sensitive display 118 is moveable between at least a first position and a second position in response to externally applied forces wherein the touch-sensitive display 118 applies a greater force to the piezoelectric element 162 in the second position than in the first position. In at least some embodiments, the piezoelectric element 162 is resiliently biased by the compliant spacers 312 and located beneath a back side of the touch-sensitive display 118 opposite to the touch-sensitive overlay 114. The movement of the touch-sensitive display 118 in response to externally applied forces causes a modulation or change in a charge of the piezoelectric element 162. More particularly, the touchscreen display 210 is movably mounted to the device 100 so that it is movable toward the base 308, thereby compressing the biasing elements 328. The touch-sensitive display 118 can also be pivoted within the housing 200 with one side or corner of the touch-sensitive display 118 moving toward the base 308, thereby compressing the biasing elements 328 on the same side of the touchscreen display 210 that moves toward the base 308.

The housing 200 also houses the at least one piezoelectric element 162. Each piezoelectric element 162 is supported on a respective support ring 316 that extends from the base 308 toward the touch-sensitive display 118. Each support ring 316 supports its respective piezoelectric element 162 while permitting flexing of the piezoelectric element 162. A linkage 322, which in the present example is in the form of a cylindrical linkage 322 is located between the piezoelectric element 162 and the support tray 310. The linkage 322 is connected to the piezoelectric element at the center of the piezoelectric element 162 and has an external diameter which is less than an internal diameter of the support ring 316.

In the present example, the touch-sensitive display 118, the support tray 310, and the linkage 322 together form an actuator 320 which may be used to transfer an externally applied force to the piezoelectric element 162. For example, to engage the piezoelectric element 162, a user of the device 100 applies a force to an external surface of the touch-sensitive display 118 which is directed, generally, towards the base 308 of the device 100. The force is transferred from the touch-sensitive display 118, to the support tray 310, through the linkage 322, and is then received at the piezoelectric element 162. The force causes the piezoelectric element 162 to deform which creates an electric charge.

Figure 4:
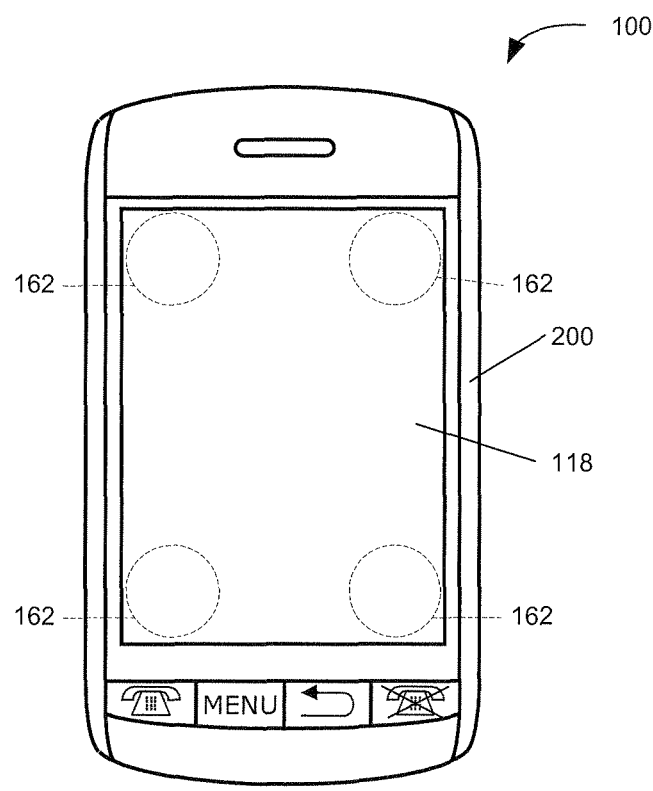
FIG. 4 is a front view of an example of a portable electronic device in a portrait orientation, showing hidden detail in ghost outline.

Referring now to FIG. 4, in some embodiments, the device 100 includes four piezoelectric elements 162. Each piezoelectric element 162 is located near a respective corner of the touch-sensitive display 118. As was shown in FIG. 3, each piezoelectric element is supported on a respective support ring 316 on one side of the base 308, proximal a respective corner of the housing 200. It will be appreciated that in various embodiments, the device 100 may include more or less piezoelectric elements 162 than are illustrated in FIG. 4.

The processor 102 is configured to operate in at least two power modes: a full-power mode; and at least one power saving mode. The full-power mode is the regular mode of operation for the device 100 when the device is powered on. In the full-power mode, all of the features of the device 100 are available for use by a user of the device 100. In the full-power mode access to features is, generally, not restricted based on power consumption concerns.

The power saving modes may include an off-mode. In the off-mode, the device 100 consumes little or no power from the power source 142. Many device components such as the touch-sensitive display 118, speaker 128, communication subsystem 104, are powered off and are unable to function in the off-mode. In some embodiments, when the device 100 is in the off-mode, the microprocessor continues to receive power from the power source 142, if power is available, so that the device 100 is able to perform background processing, such as monitoring the current time.

In some embodiments, the power-savings modes provided by the processor 102 may include a sleep-mode. In the sleep-mode, the processor 102 provides for less functionality of the device 100 than when the device 100 is in the full-power mode, but more functionality than when the device 100 is in the off-mode. For example, in the sleep-mode, the processor 102 may be configured to turn off the touch-sensitive display 118. The processor 102 may, however, permit the communication subsystem 104 to continue communicating with the network 150.

In some embodiments, in order to reduce power consumption, when the device 100 is in one or more of the power-savings modes, the controller 116 and the processor 102 do not scan or otherwise monitor the touch-sensitive overlay 114 of the touch-sensitive display 118 for a touch input.

The processor 102 may be configured to cycle between the power modes in response to a number of trigger events. For example, in some embodiments, a power interface (not shown) or the processor 102 are configured to monitor the power remaining in the power source 142 and the processor 102 is configured to enter one of the power saving modes in response to the remaining power of the power source 142 falling below a predetermined remaining power threshold. In some embodiments, the microprocessor may be configured to switch to the power-savings mode which consumes the least amount of power (i.e. the off-mode) when the threshold is reached.

In some embodiments, multiple remaining power thresholds may be used, each threshold having an associated power mode. When a given threshold is reached, the processor 102 may cause the device 100 to enter the power mode that is associated with that threshold. For example, a first threshold may be associated with the sleep-mode. If the remaining power falls below the first threshold, the processor 102 may enter the sleep-mode, if it is not already in the sleep-mode. Similarly, a second threshold may be associated with the off-mode. If the remaining batter power falls below the second threshold, the processor 102 may cause the device 100 to enter the off-mode.

In some embodiments, the trigger event which causes the processor 102 to switch modes may be related to the elapsed time since a user's last interaction with one or more of the touch-sensitive display 118 or possibly other input devices of the auxiliary I/O 124. The processor 102 may be configured to monitor the time elapsed following a user's last interaction with the touch-sensitive display 118 or possibly other input devices. The processor 102 may compare the elapsed time to a predetermined timeout period and switch the device 100 to one of the power-savings modes if the elapsed time following the user's last interaction with an input device is greater than the predetermined timeout period. The processor 102 may have multiple timeout periods which each have an associated power mode. When the elapsed time reaches a given predetermined timeout period, the processor 102 may cause the device to enter the power-savings mode that is associated with that timeout period. For example, a first timeout period may be associated with the sleep-mode. If the elapsed time reaches the first timeout period, the processor 102 may enter the sleep-mode, if it is not already in the sleep-mode. Similarly, a second timeout period may be associated with the off-mode. If the elapsed time reaches the second threshold, the processor 102 may cause the device to enter the off-mode.

In some embodiments, the trigger event which causes the processor 102 to switch modes may be a user-initiated trigger event. For example, the user may trigger the mode by using the touch-sensitive display 118 or possibly other input device to navigate a graphical user interface associated with the device 100 and select a mode-switch option. By way of example and not limitation, a user may select a "power down" or "off" option to place the device in the off-mode. Similarly, the user may select a "sleep-mode" option to place the device in the sleep-mode.

It will be appreciated that other trigger events may also be used to cause the device 100 to switch modes. By way of further example and not limitation, the device 100 may have a program 148 which allows a user to schedule mode switches. In such embodiments, the processor 102 may be configured to automatically switch the device 100 to another mode at a scheduled time. For example, a user may set the device 100 to automatically switch to the off-mode in the evenings, and switch back to the on-mode in the mornings.

Figure 5:
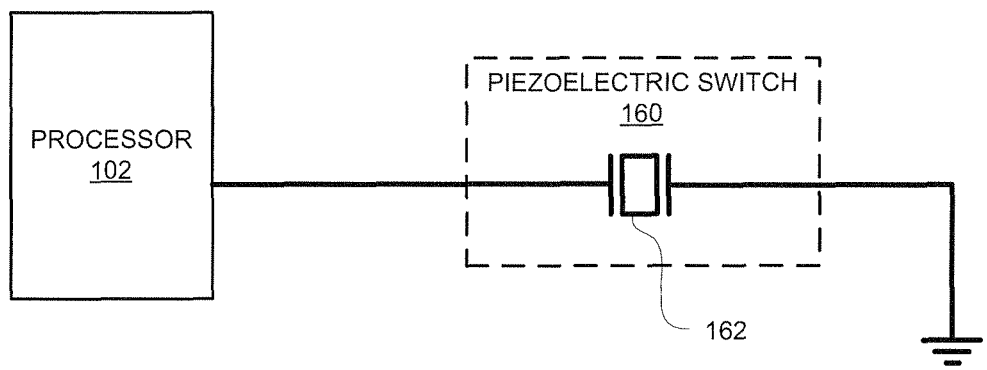
FIG. 5 is a simplified block diagram showing a piezoelectric switch 160 in accordance with an embodiment of the present disclosure.

Referring to FIG. 5, a simplified diagram is shown which illustrates the processor 102 and the piezoelectric switch 160 in accordance with one embodiment. In this embodiment, the electric signal that is applied to the processor 102 of the device 100 is an electric charge created by the piezoelectric element 162. That is, the output of the piezoelectric element 162 is connected directly to the processor 102.

The output of the piezoelectric element 162 may, in some embodiments, be a very brief electric charge which has a high peak voltage. That is, the piezoelectric element 162 may create a voltage spike when an external force is applied to the piezoelectric element 162. Depending on the capabilities of the processor 102, the electric charge produced by the piezoelectric element 162 in response to a force being applied to the element may not be suitable for direct application to the processor 102. For example, in some embodiments, the piezoelectric element 162 may have the ability to produce an electric charge which exceeds the recommended operating voltage for the processor 102. In other cases, the electric charge may be a spike which is too short in duration for the processor 102 to properly interpret. In other cases, the electric charge may be too small for the processor 102 to detect.

Figure 6:
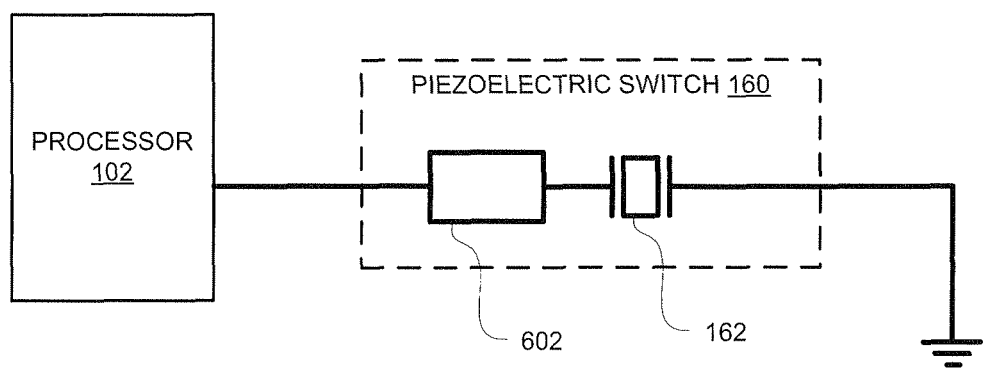
FIG. 6 is a simplified block diagram showing a piezoelectric switch 160 in accordance with another embodiment of the present disclosure.

FIG. 6 shows another embodiment of the piezoelectric switch 160 which comprises a signal conditioner 602 which is used to address one or more of these concerns. The signal conditioner 602 prepares the electric charge produced by the piezoelectric element 162 for input to the processor 102. In various embodiments, the signal conditioner 602 may be comprised of one or more of: a voltage regulator for producing a specific output voltage over a range of input voltages, a surge protector for limiting the output voltage if it exceeds a threshold, and/or a relay for regulating a voltage and or extending the duration of a voltage spike.

Figure 7:
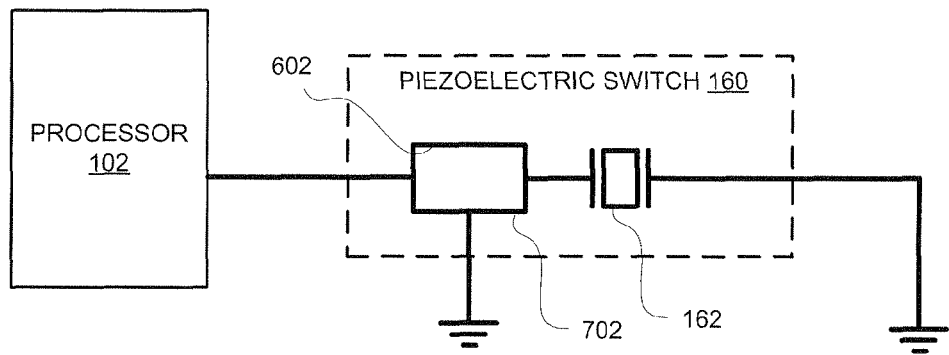
FIG. 7 is a simplified block diagram showing a piezoelectric switch 160 in accordance with a further embodiment of the present disclosure.

FIG. 7 shows a further embodiment of the piezoelectric switch 160 which comprises a voltage regulator 702. The piezoelectric switch 160 includes at least one piezoelectric element 162. In this embodiment, the piezoelectric switch 160 includes the signal conditioner 602, which, in the shown embodiment, is a voltage regulator 702. The voltage regulator 702 has an input that is electrically connected to the piezoelectric element 162. The voltage regulator 702 receives, at its input, the electric charge which is produced by the piezoelectric element 162. The voltage regulator 702 produces a steady output voltage over a range of input voltages. That is, when the electric charge produced by the piezoelectric element 162 is above a threshold, the voltage regulator 702 produces a specific electric signal. When the electric charge is above the threshold, the electric signal that is output from the voltage regulator 702 is approximately the same irrespective of the degree to which the electric charge exceeds the threshold. For example, the output electric signal will be approximately the same when the input electric charge exceeds the threshold by five percent as when it exceeds the threshold by seventy-five percent. The output of the voltage regulator is electrically connected to the processor 102 so as to apply the output electric signal to the processor 102. However, when the electric charge is below the threshold, the voltage regulator will produce no voltage.

Figure 8:
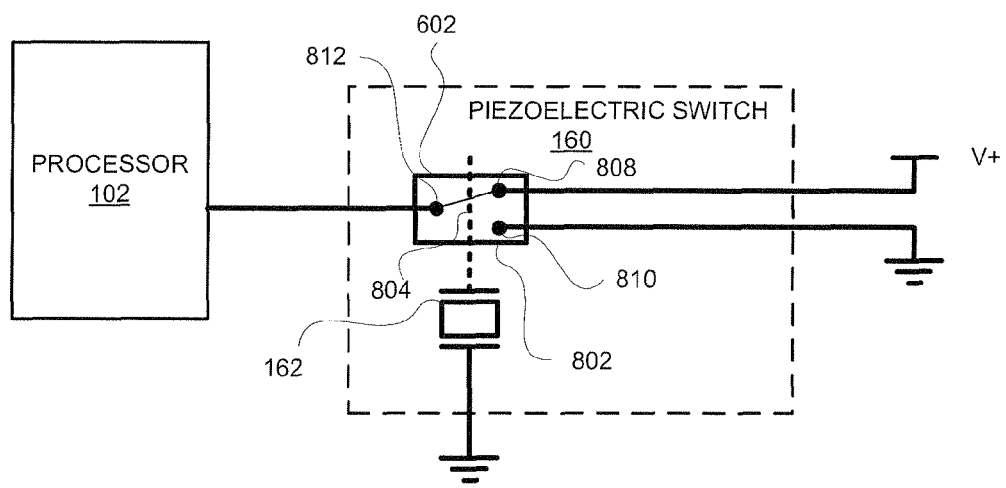
FIG. 8 is a simplified block diagram showing a piezoelectric switch 160 in accordance with yet a further embodiment of the present disclosure.

FIG. 8 shows a further embodiment of the piezoelectric switch 160 in which the signal conditioner 602 includes a relay 802. In some embodiment, a control input 804 of the relay 802 is connected to the piezoelectric element 162 to allow the piezoelectric element 162 to control the relay 802. The relay 802 may be, for example, a single pole double throw relay 802 which has inputs 808, 810 which are connected to a power supply and ground respectively. The relay 802 has an output 812 which is connected to the processor 102. In the embodiment shown, when a force is applied to the piezoelectric element 162, an electric charge is produced. The electric charge is used to control the relay 802. If the electric charge 812 exceeds a threshold, the relay 802 switches from its previous state. That is, if in the previous state the output 812 was connected to the power supply input 808, then it will switch to being connected to the ground input 810. Similarly, if in the previous state the output 812 was connected to the ground input 806, then it will switch to being connected to the power supply input 808. The output 812 is applied as an electric signal to the processor 102, which senses the switch between being connected to power and being connected to ground and changes power modes in response to the switch as described above.

While the relay in FIG. 8 was a single pole double throw relay, it will be appreciated that other types of relays 802 may be used. For example, in some embodiments, the relay 802 may be a single pole single throw relay 802. It will also be appreciated that, in some embodiments, the relay 802 may be a transistor, such as a metal oxide semiconductor field effect transistor (MOSFET).

Figure 9:
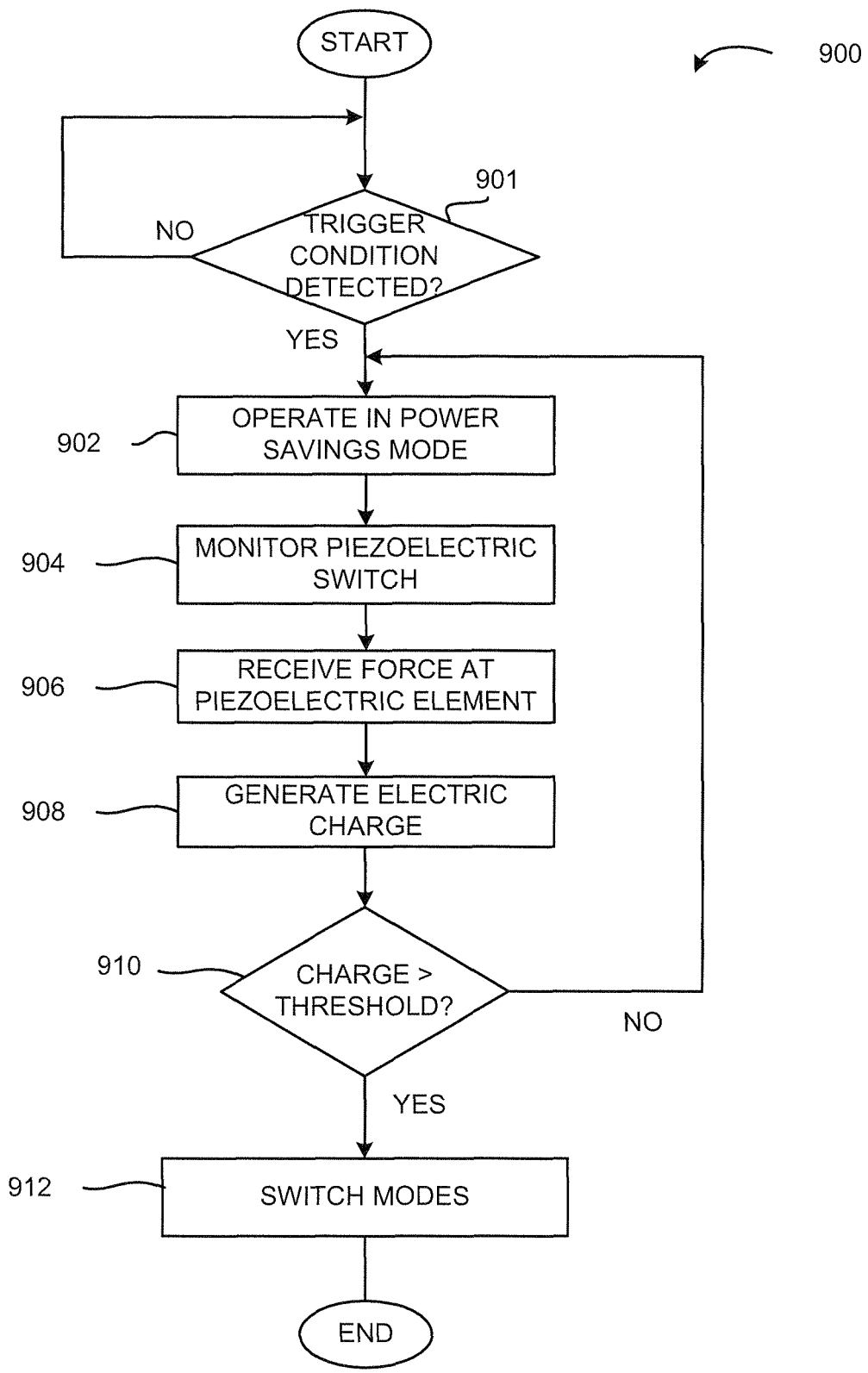
FIG. 9 is a flowchart of a process for switching power modes on a portable electronic device in accordance with an embodiment of the present disclosure.

FIG. 9 shows a flowchart illustrating a method 900 of switching power modes on the portable electronic device 100 in accordance with one example embodiment. The steps of FIG. 9 may be carried out by routines or subroutines of software executed by, for example, the processor 102. The coding of software for carrying out such steps is well within the scope of a person of ordinary skill in the art given the present disclosure. For example, the power modes may be implemented by a powering saving process or sleep process which operates in the background as part of the operating system 146.

In the first step 901, the processor 102 monitors for one or more predetermined trigger conditions for entering a power saving mode. The one or more trigger conditions may be include any one or more of a selection of a sleep/standby option via corresponding input or possibly a device lock option via corresponding input, user inactivity for a predetermined duration, lack of wireless network coverage for a predetermined duration, a holstering or closing of the portable electronic device 100, or other suitable trigger condition.

The power saving mode may be, for example, an off-mode. In the off-mode, the device 100 consumes little or no power from the power source 142. Many device components such as, for example, the touch-sensitive display 118, speaker 128, communication subsystem 104, are powered off and are unable to function. In some embodiments, the power saving mode may be a sleep-mode. In the sleep-mode, the device 100 has less functionality than when the device is in a full-power mode, but more functionality than when the device 100 is in the off-mode. For example, in the sleep-mode, the display may be turned off. The device 100 may, however be able to send and receive communications from the network 150 in the sleep-mode.

When one of the trigger conditions is detected, the processor 102 initiates the power saving mode (step 902). The power saving mode may comprise the processor 102 switching from the system clock to the sleep clock and deactivating (e.g., powering off) the touch-sensitive display 118. When deactivated, the touch-sensitive display 118 does not measure touch data or detect touch events and its backlight is deactivated/disabled.

In some embodiments, a locked mode may also be initiated in response to detecting one of the trigger conditions for entering a sleep mode when the sleep mode is itself triggered by a locking process, depending on the configuration of the locking process. In the locked mode, restrictions limiting interaction with the portable electronic device 100 are enforced. The restrictions typically affect at least some of its input interfaces/devices (e.g., overlay 114, auxiliary I/O 124, accelerometer 136) and at least some of its output interfaces/devices (e.g., display screen 112, speaker 128).

Next, at step 904 when the device 100 is in the power saving mode, the processor 102 monitors a piezoelectric switch 160 to determine whether the device should switch modes.

At step 906, a force is applied to a piezoelectric element 162 of the piezoelectric switch 160. The force causes a mechanical stress of the piezoelectric element 162 and, at step 908, the piezoelectric element 162 generates an electric charge.

In some embodiments, at step 910, a determination may be made as to whether the electric charge exceeds a threshold. This determination may be implemented in a number of ways. In some embodiments, such as the embodiment shown in FIG. 5, the piezoelectric element 162 is connected to the processor 102 so that the processor 102 receives, as an input, the electrical charge generated by the piezoelectric element 162. The processor 102 may be configured to only recognize the electric charge as a trigger to switch power modes if the electric charge is greater than a threshold charge.

In the embodiment of FIG. 7, the step 910 of determining whether the charge exceeds a threshold may be made, at least in part, by the voltage regulator 702. In this embodiment, the voltage regulator 702 may have a threshold charge. If an electric charge from the piezoelectric element 162 is applied to the regulator which is below the threshold voltage, the voltage regulator will simply provide no voltage to the processor 102. If the electric charge exceeds the threshold, then the voltage regulator will provide a predetermined electric signal to the processor 102.

In the embodiment of FIG. 8, the step 910 of determining whether the charge exceeds a threshold may be made, at least in part, by the relay 802. The relay 802 has a threshold charge. If the electric charge from the piezoelectric element 162 which is applied to the control input 804 of the relay 802 exceeds the threshold charge, then the relay 802 will switch. That is, the relay 802 will switch the input 808, 810 that it is connected to the output 812 of the relay 802. If the electric charge from the piezoelectric element 162 is less than the threshold charge, no switching will occur.

Referring again to FIG. 9, next, at step 912, in response to the generation of an electric charge by the piezoelectric element 162 that exceeds the threshold, the processor 102 causes the device 100 to switch modes. That is, the device 100 is switched from one of the power-savings modes to the full-power mode. For example, if the device 100 is in the off-mode, at step 912, it is switched to the full-power mode. Similarly, in at least some embodiments, if the device 100 is in the sleep-mode, it is switched to the full-power mode. In this way, the piezoelectric switch 160 acts as a "wake-up" switch or "on" switch to either awake the device 100 from a reduced power mode such as a sleep-mode, or switch the device from an off-mode to an on-mode.

Figure 10:
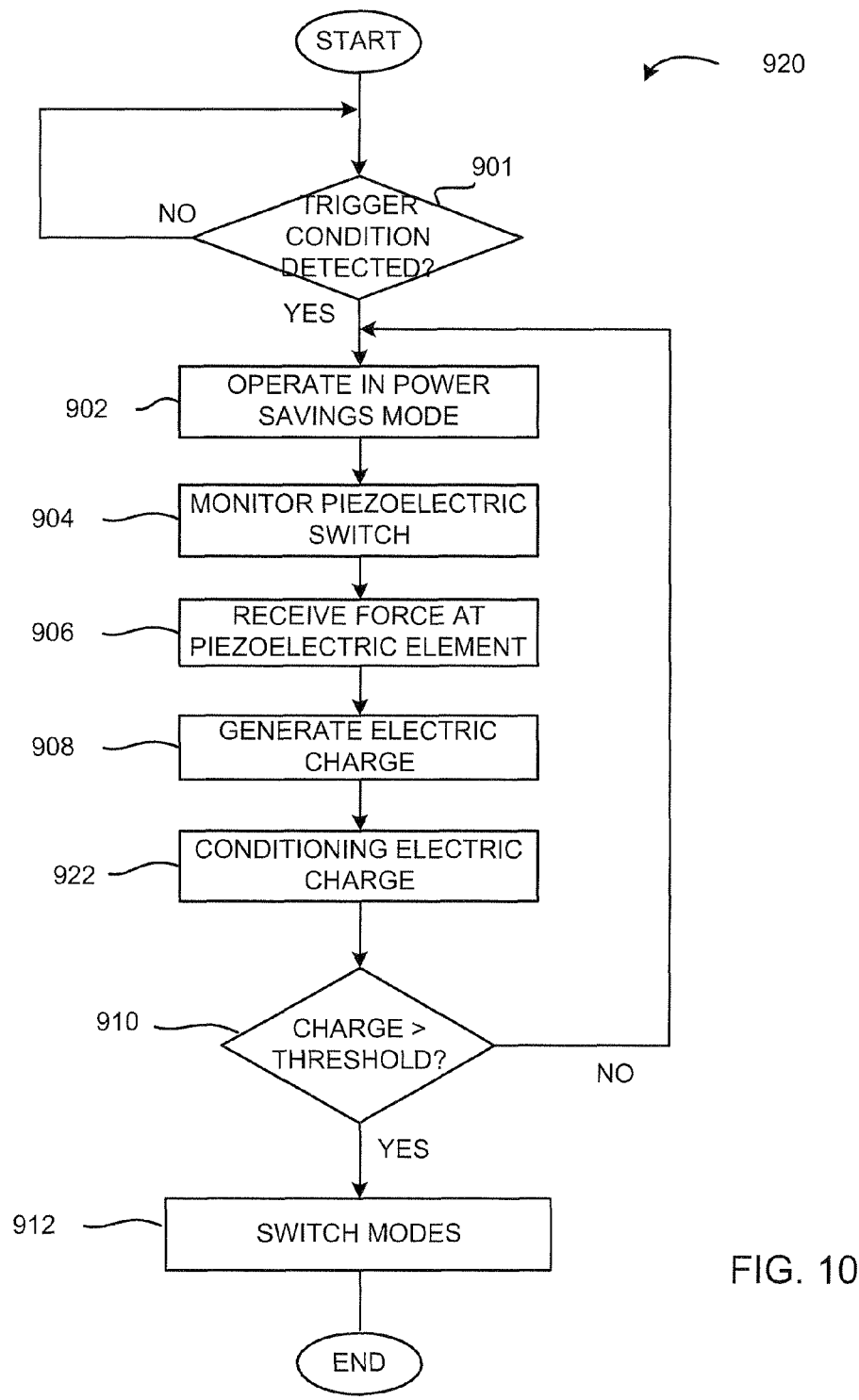
FIG. 10 is a flowchart of a process for switching power modes on a portable electronic device in accordance with another embodiment of the present disclosure.

FIG. 10 shows a flowchart illustrating a method 920 of switching power modes on the portable electronic device 100 in accordance with another example embodiment. The steps of FIG. 9 may be carried out by routines or subroutines of software executed by, for example, the processor 102. The coding of software for carrying out such steps is well within the scope of a person of ordinary skill in the art given the present disclosure. For example, the power modes may be implemented by a powering saving process or sleep process which operates in the background as part of the operating system 146.

This method 920 parallels the method 900 of FIG. 9 except that it further includes an additional step 922 of conditioning the electric charge generated by the piezoelectric element 162. The step of conditioning the electric charge is used to convert the electric charge into an electric signal which is better suited for receipt by the microprocessor. For example, in some embodiments, the piezoelectric element 162 may have the ability to produce an electric charge which exceeds the recommended operating voltage for the processor 102. In other cases, the electric charge may be a voltage spike which is too short in duration for the processor 102 to properly interpret it. In other cases, the electric charge may be too small for the processor 102 to detect it. The step of conditioning the electric charge may address one or more of these scenarios. For example, the step of conditioning the electric charge may include any one or more of the following steps: reducing the peak of the electric charge or otherwise limiting surges; increasing the peak of the electric charge; or extending the duration of the electric charge.

While the present disclosure is described primarily in the context of a portable electronic device 100 having a touch-sensitive display 118, it will be appreciated that the teachings provided herein can be applied to conventional display screens which are not part of a touch-sensitive display 118.

While the present disclosure is primarily described in terms of methods, a person of ordinary skill in the art will understand that the present disclosure is also directed to various apparatus such as a portable electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A portable electronic device, comprising:
a housing;
a processor received within the housing;
a display screen connected to the processor and movable from a first position to a second position relative to the housing in response to an externally applied force;
a base received within the housing;
biasing elements located between a back of the display screen and the base, the biasing elements urging the display screen away from the second position toward the first position;
a piezoelectric switch connected to the processor, the piezoelectric switch comprising a piezoelectric element positioned by a back side of the display screen, the piezoelectric element generating an electric charge when the piezoelectric element is deformed by a force applied to the display screen and transferred to the piezoelectric element, the piezoelectric element being directly connected to the processor to output the electric charge directly to the processor; and
wherein the processor is configured for switching between at least two power modes in response to receipt of the electric charge from the piezoelectric element.

2. The portable electronic device of claim 1, the display screen applying a greater force to the piezoelectric element in the second position than in the first position.

3. The portable electronic device of claim 1, wherein the display screen is a touch-sensitive display.

4. The portable electronic device of claim 1, wherein the processor is configured to switch from a power saving mode to a full-power mode in response to the receipt of the electric charge from the piezoelectric element.

5. The portable electronic device of claim 4, wherein the power saving mode is a sleep-mode.

6. The portable electronic device of claim 4, wherein the power saving mode is an off-mode.

7. The portable electronic device of claim 4, wherein the processor is configured to deactivate the display screen in the power saving mode.

8. A method of switching power modes on a portable electronic device, the method comprising:
receiving a force at a piezoelectric element positioned by a back side of a display screen, the force acting against a biasing force urging the display screen into a first position and causing the display screen to move from the first position to a second position relative to a housing of the portable electronic device, the force being transferred to the piezoelectric element;
generating an electric charge at the piezoelectric element in response to deformation of the piezoelectric element by the force;

conditioning, by a signal conditioner, the electric charge into a conditioned electric charge for direct output to a processor of the portable electronic device;

when the processor receives the conditioned electric charge, switching the portable electronic device between a first power mode and a second power mode.

9. The method of claim 8, wherein the first power mode is a power saving mode and second power mode is a full-power mode.

10. The method of claim 9, wherein the power saving mode is a sleep-mode.

11. The method of claim 9, wherein the power saving mode is an off-mode.

12. The method of claim 9, wherein a display screen of the portable electronic device is deactivated in the power saving mode and wherein switching the portable electronic device to the full-power mode comprises reactivating the display screen.

13. The method of claim 9, further comprising initiating the power saving mode in response to detection of a trigger condition.

14. The method of claim 8, wherein conditioning the electric charge into the conditioned electric charge comprises switching a relay from a first state to a second state when the electric charge exceeds a threshold, wherein no electric charge is outputted to the processor in the first state and the conditioned electric charge is outputted to the processor in the second state, the conditioned electric charge being outputted by the relay directly to the processor.

15. A portable electronic device, comprising:
a housing;
a processor received within the housing;
a touch-sensitive screen connected to the processor, the touch-sensitive screen being mounted within the housing for movement from a first position to a second position relative to the housing in response to an externally applied force;
a piezoelectric switch connected to the processor, the piezoelectric switch comprising:
a piezoelectric element positioned by a back side of the touch-sensitive screen, the piezoelectric element generating an electric charge when the piezoelectric element is deformed by movement of the touch-sensitive screen from the first position to the second position; and
a signal conditioner electrically connected to the piezoelectric element for conditioning the electrical charge into a conditioned electrical charge for direct input to the processor;
the piezoelectric element being connected to output, via the signal conditioner, the conditioned electric charge directly to the processor;
wherein the processor is configured to switch between at least two power modes in response to receipt of the conditioned electric charge.

16. The portable electronic device of claim 15, further comprising:
a base received within the housing; and
biasing elements located between a back of the display screen and the base, the biasing elements urging the display screen away from the second position toward the first position;
the display screen applying a greater force to the piezoelectric element in the second position than in the first position.

17. The portable electronic device of claim 15, wherein the processor is configured to switch from a power saving mode to a full-power mode in response to the receipt of the conditioned electric charge.

18. The portable electronic device of claim 15, wherein the signal conditioner comprises a voltage regulator for receiving the electric charge generated by the piezoelectric element and the voltage regulator conditions the electric charge by providing the conditioned electric charge to the processor if the electric charge exceeds a threshold and providing no electric charge if the electric charge does not exceed the threshold, the voltage regulator being connected to output the conditioned electric charge directly to the processor.

19. The portable electronic device of claim 15, wherein the signal conditioner comprises a relay operably connected to the piezoelectric element and the relay conditions the electric charge by switching from a first state to a second state when the electric charge exceeds a threshold, the piezoelectric relay providing no electric charge to the processor in the first state and providing the conditioned electric charge in the second state, the relay being connected to output the conditioned electric charge directly to the processor.

20. The portable electronic device of claim 19, wherein the conditioned electric charge is a voltage provided by a power supply when the relay is in the first state.

* * * * *